Oct. 3, 1939.   W. F. ERRIG ET AL   2,174,874
TIRE TREATING APPARATUS
Filed Jan. 8, 1938
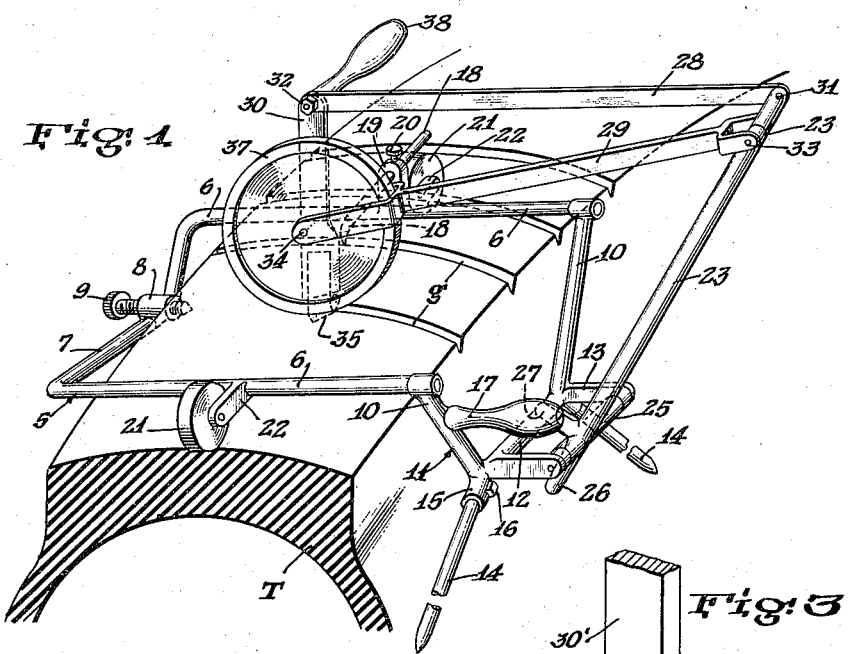
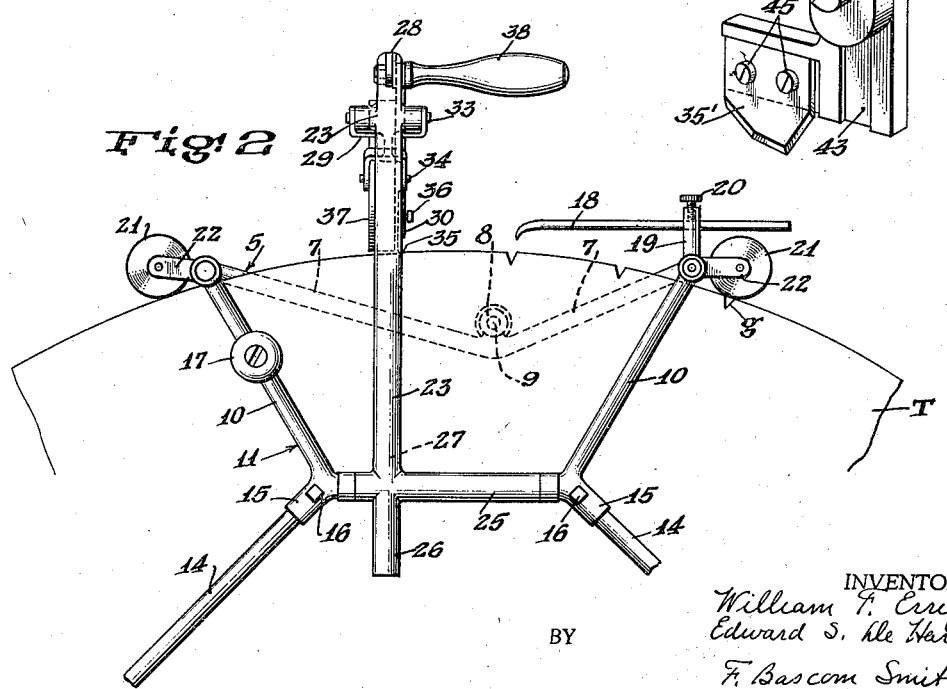
INVENTOR.
William F. Errig
Edward S. le Hart
BY F. Bascom Smith
ATTORNEY.

Patented Oct. 3, 1939

2,174,874

UNITED STATES PATENT OFFICE 2,174,874

TIRE-TREATING APPARATUS

William F. Errig, Jenkintown, Pa., and Edward S. De Hart, Collingswood, N. J., assignors to Peco Manufacturing Corporation, Philadelphia, Pa., a corporation of Pennsylvania Application January 8, 1938, Serial No. 183,982

6 Claims. (Cl. 90—24)

This invention relates to tire treating apparatus and more particularly to means whereby incisions may be cut in the surfaces of vehicle tires.

One of the objects of the present invention is to provide novel manually operable means for cutting incisions in the surface of a tire to increase the non-skid qualities thereof.

Another object is to provide novel apparatus for treating the road-engaging surfaces of tires or the like which is so constructed as to be readily portable and operable without the exercise of special skill.

Still another object is to provide novel tire treating apparatus which is extremely simple both in construction and operation and which may be readily and inexpensively manufactured.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claims.

In the drawing, wherein like reference characters refer to like parts throughout the several views, Fig. 1 is an isometric view, with parts broken away, of one form of the device embodying the present invention;

Fig. 2 is an end elevation of said device with parts thereof broken away, the view being taken from the end at which the operator stands while operating the device; and, Fig. 3 is a detail view showing a modification of the mounting for the cutting tool.

A single embodiment of the invention is illustrated in the drawing, by way of example, in the form of a readily portable device adapted to be manually operated for cutting transversely extending incisions in the surfaces of vehicle tires. Said device is so constructed that the portable frame thereof may be easily held in firm yet temporary engagement with the tire to be treated thereby eliminating any danger of relative movement between said tire and frame during a cutting operation. The cutting blade or tool of the device is carried by a freely movable linkage whereby incisions may be cut in tires having any desired surface contour without the necessity for making any special adjustments. Means are also provided for controlling the maximum depth of the incisions to be cut and for reducing to a minimum the effort required for manipulating the cutting tool.

In the form shown, the frame portion of the illustrated device comprises a horizontally disposed, U-shaped member 5 having a pair of spaced parallel bars 6, 6 and a crossbar 7 at one end thereof. Said cross-bar is bent downwardly, as viewed in the drawing (Fig. 2), and has an integrally threaded boss 8 secured thereto at the lowermost point thereof, which point is preferably at one side of the center of said bar. A spindle 9, the purpose of which will hereinafter appear, is threaded through boss 8 so that the inner, somewhat pointed end thereof is adapted to engage one of the side walls of a tire to be treated.

The ends of bars 6, 6 opposite crossbar 7 are fixedly secured to the upper ends of the diverging arms 10, 10 of a vertically disposed, U-shaped member 11. The lower ends of said arms are connected by a crossbar 12 which is integral with said arms and carries a pair of laterally spaced, horizontally extending bearing arms 13, 13. Removably secured to member 11 are a pair of diverging legs 14, 14, the lower ends of which are adapted to engage the other side of the tire to be treated, i. e., the side opposite to spindle 9, at two substantially diametrically disposed points. In the illustrated embodiment, legs 14, 14 are telescopically received by suitable bosses 15, 15 on member 11 and held in place by set screws 16, 16 or other suitable means.

Secured to and extending horizontally from one of the arms 10 is a handle 17 by means of which the above-described frame may be moved to and held in the desired position relative to the tire to be treated. Means are also provided on said frame for properly positioning the same relative to the tire, said means, in the form shown, comprising a pointer 18 slidably mounted in an upwardly extending ear 19 which may be rigidly or adjustably secured to one of the arms 6. Pointer 18 may be held in position in said ear by any suitable means such as a thumb screw 20. The pointer is preferably so positioned on bar 6 so that when the apparatus is properly positioned relative to the tire by proper adjustment of spindle 9 said pointer will be in the center of the peripheral wearing surface of said tire.

Suitable means are also provided for the purpose of facilitating the movement of frame 6, 10 and the associated mechanism to be hereinafter described about the periphery of the tire or the rotation of the tire relative to said frame. Such means, in the form illustrated, are constituted by a pair of rollers 21, 21 rotatably mounted on axes which extend parallel to bars 6 and which are supported by brackets 22, 22, the latter being constituted by pairs of arms projecting laterally at right angles from bars 6 and formed integrally therewith.

Novel means are movably mounted on frame 6, 10 whereby a tire treating tool may be readily reciprocated transversely of the tire or other article being treated, said means being so constructed that said tool may be caused to follow any desired contour without material change in the angular relation between the surface being treated and the tool. In the embodiment illustrated, said novel means includes a lever 23 freely supported for pivotal movement on a pin or shaft 24 which extends through a hub portion 25 of said lever and into the outer ends of bearing arms on bracket 13, 13. For limiting the pivotal movement of lever 23, the latter is provided with a downwardly extending portion 26 and a forwardly extending portion 27, which portions are adapted to engage crossbar 12 when the lever is moved in clockwise and counter-clockwise directions, respectively.

The upper end of lever 23 serves as one side of a freely movable quadrangular linkage, the other three sides of which are constituted by links 28, 29 and 30. The opposite ends of link 28 are pivotally secured to the upper ends of lever 23 and a member 30 at points 31 and 32, respectively, whereas the bifurcated ends of link 29 are pivotally secured to said lever and member intermediate the ends thereof at points 33 and 34, respectively. The lower end of member 30 which extends downwardly from pivot 34 has a knife 35 adjustably secured thereto by any suitable means well known in the art. As shown in Fig. 2, said knife or blade slidably fits into a recess in the lower end of member 30 and is held in adjusted position therein by a set screw 36. Knife 35 may be formed with a V-shaped cutting edge (Fig. 2) which is adapted to cut grooves $g$ in the surface of the tire T being treated. If desired, a straight blade may be employed for slitting the tire without removing any rubber therefrom.

In order to gauge or control the maximum depth of the incisions cut in the tire by tool 35 and to facilitate the movement of said tool across the tire during a cutting operation, a guide roller 37 is provided. Said roller is rotatably mounted, preferably by means of a roller or frictionless bearing, on axis 34 which extends between the arms of the bifurcated end of link 29. Roller 37 is thus mounted adjacent knife 35 and is adapted to engage the tire so that the maximum depth to which the knife may cut the latter is determined by the extent to which said knife projects beyond the periphery of the roller. For manipulating tool 35 either with roller 37 in engagement or out of engagement with the tire, a handle 38 is freely mounted on a laterally projecting portion of pivot pin 32 in a position to be readily grasped by the operator's right hand.

In operation, the above-described device is placed on a tire T, which is preferably mounted on a horizontally extending axis, with rollers 21, 21 engaging the road-engaging periphery of the tire and with bars 6, 6 extending parallel to the axis of rotation of the tire. Spindle 9 is then caused to engage one side of the tire and is adjusted until pointer 18 is in substantial alignment with the center of said road-engaging surface. A downward pressure is then exerted on handle 17, which is grasped by the operator's left hand, to move some part of each of the arms 10, 14 into engagement with the side of the tire or its support opposite spindle 9 and thus firmly clamp frame 6, 10 against movement relative to the tire. Grasping handle 38 with his right hand, the operator now presses the forward edge of roller 37 against the tire and moves the same, together with knife 35, across the tire toward the left, as viewed in Fig. 1, to cut an incision $g$, the roller being of a suitable diameter to cause the knife to move into and out of engagement with the tire at the desired points on each side thereof. It will be seen that the linkage 23, 28, 29, 30 permits roller 37 and hence knife 35 to move in any desired direction in the plane of movement and accordingly permits the roller to follow the contour of any tire irrespective of the size or uneven wearing thereof.

After cutting an incision in the tire in the above manner, roller 30 is lifted out of engagement with the tire by means of handle 38 and the pressure on handle 17 is relieved. The apparatus now rests on rollers 21 and is moved peripherally of the tire by means of handle 17 a distance determined by the desired spacing of the incisions. The peripheral spacing of incisions $g$ in tire T and hence the desired movement of the cutting apparatus relative to the tire, or vice versa, after each cutting operation, may be determined by bringing pointer 18 into alignment with successive incisions which have already been made. If closer spacing of the incisions is desired, pointer 18 may be adjusted to a position relatively closer to the path of blade 35 or the spacing of the first few incisions may be determined by eye or by providing chalk or pencil marks on the tire. It will be understood also that suitable means may be provided for imparting step-by-step movement to the tire after each cutting operation in lieu of moving the cutting unit.

The modification of the means for adjustably mounting the cutting tool, as shown in Fig. 3, comprises a slot 40 in the lower offset portion of a bar 30' which corresponds to bar 30 of Fig. 1 and is provided with an opening 41 for receiving pivot pin 34. Bar 30' is also provided with dovetailed ribs 42 at each end of slot 40 which ribs are adapted to be slidably received by a corresponding groove 43 in a tool carrying member 44. A thumb screw 36' projecting through slot 40 and threadedly received by member 44 is adapted to clamp said member in adjusted position on bar 30'. In the form shown, a straight blade knife 35', which is adapted to cut slits in the surface being treated, is secured to member 44 by any suitable means, such as screws 45.

There is thus provided novel apparatus adapted for treating new or used tires to improve the non-skid qualities thereof, said apparatus being of a light-weight, readily portable construction which may be manually operated without the exercise of any special skill. Said apparatus is also constructed so that the maximum depth of incisions cut in the tire may be accurately gauged and so that the manual cutting operation may be performed with ease and celerity. Additionally, the cutting tool of the apparatus is so mounted that the same may, without any extra effort on the part of the operator, be caused to follow the contour of a tire irrespective of the size or unevenly worn surface thereon. Said apparatus comprises only a small number of simple yet rugged parts and may be readily manufactured at low cost.

Although only a single embodiment of the invention has been illustrated and described in detail, it is to be expressly understood that the same is not limited thereto, but that various changes may be made therein, such for example, as in the design and arrangement of parts illustrated, without departing from the spirit and scope of the invention, as will now be understood by those skilled in the art. For a definition of the limits of the invention, reference is had primarily to the appended claims.

What is claimed is:

1. In apparatus of the class described, supporting means adapted to be held in gripping engagement with a vehicle tire, a quadrangular linkage having a free pivot at each corner thereof and being pivotally supported by said supporting means, and a tool for cutting incisions in said tire supported by said linkage.

2. In apparatus of the class described, supporting means adapted to be held in gripping engagement with a vehicle tire, a quadrangular linkage pivotally supported by said supporting means, each link of said linkage being pivotally connected to two other links of said linkage, a tool for cutting incisions in said tire supported by said linkage, and means carried by said linkage adjacent said tool for controlling the maximum depth of said incisions.

3. In apparatus of the class described, the combination of supporting means including means for engaging opposite sides of a vehicle tire, means on said supporting means whereby the latter may be held in gripping engagement with a vehicle tire, means for indicating the relative position of said tire and said supporting means, a quadrangular linkage supported by said supporting means, each link of said linkage being pivotally connected to two other links of said linkage, and a tool for cutting incisions in said tire supported by said linkage.

4. In apparatus of the class described, the combination of supporting means adapted to be manually held in gripping engagement with a vehicle tire, a collapsible multi-angular linkage pivotally supported by said supporting means, each link of said linkage being pivotally connected to at least two other links of said linkage, roller means rotatably carried by said linkage, and a tool for cutting incisions in the surface of said tire adjustably supported by said linkage adjacent said roller means whereby the latter is adapted to control the maximum depth of said incisions.

5. In apparatus of the class described, the combination of supporting means adapted to be manually held in gripping engagement with a vehicle tire, a tool for treating the road engaging surface of said tire, and means mounted on said first-named means for supporting said tool for movement relative to said tire, said second-named means comprising a multi-angular linkage having a free pivot at each corner thereof, said pivots having parallel axes.

6. In apparatus of the class described the combination of supporting means adapted to be held in gripping engagement with a vehicle tire, a cutting tool, and a multi-angular linkage having the links thereof freely pivoted together and being pivotally mounted on said supporting means for supporting said tool for movement relative to said tire to cut incisions therein, all of the pivots of said linkage and the supporting pivot for the latter having parallel axes.

WILLIAM F. ERRIG.
EDWARD S. DE HART.